(12) United States Patent (10) Patent No.: US 8,007,354 B2
Mindes (45) Date of Patent: Aug. 30, 2011

(54) METHOD AND SYSTEM FOR FIXED ODDS EXOTIC AND STRAIGHT BETTING WITH PARI-MUTUEL RULES

(76) Inventor: Barry Mindes, Fort Lee, NJ (US)

( * ) Notice: Subject to any disclaimer, the term of this patent is extended or adjusted under 35 U.S.C. 154(b) by 791 days.

(21) Appl. No.: 12/072,373

(22) Filed: Feb. 26, 2008

(65) Prior Publication Data

US 2008/0207310 A1 Aug. 28, 2008

Related U.S. Application Data

(60) Provisional application No. 60/903,968, filed on Feb. 28, 2007.

(51) Int. Cl.
*A63F 9/24* (2006.01)
(52) U.S. Cl. ............................. 463/16; 463/26
(58) Field of Classification Search .............. 463/16, 463/25–40; 273/139; 700/91; 705/38
See application file for complete search history.

(56) References Cited

U.S. PATENT DOCUMENTS

| | | | |
|---|---|---|---|
| 5,672,106 A * | 9/1997 | Orford et al. | 463/28 |
| 5,842,921 A | 12/1998 | Mindes et al. | |
| 6,695,701 B2 * | 2/2004 | Aronson et al. | 463/28 |
| 2005/0102223 A1 * | 5/2005 | Vlazny et al. | 705/38 |
| 2005/0116410 A1 * | 6/2005 | Vlazny et al. | 273/139 |

\* cited by examiner

*Primary Examiner* — Masud Ahmed (74) *Attorney, Agent, or Firm* — Porzio, Bromberg & Newman, P.C.

(57) ABSTRACT

The system and method disclosed facilitates betting that allows the punter, bettor or wagerer to know the exact current odds and specify the minimum fixed odds and/or payout that will be received on a successful bet if the wager is accepted, while also assuring that the betting pool created is a true pari-mutuel. The disclosed system and method also guarantees that there will always be at least one winner of the betting pool regardless of the number, pattern and distribution of the bets placed. The system's features, in ensemble, make horse race wagering a much more analytic sport, where betting skills bring significant rewards. It elevates horse race wagering to a level where risk can be properly evaluated in terms of potential gain and maximizes the likelihood that a bet will be accepted at the most favorable odds possible. The present invention defines the winner of the pool as the bet that "most correctly" selects the winning combination from among the bets entered into the pool, which might not necessarily be the actual winning combination in the race(s). Determining the most correct punter ensures there is a winner from among the bets placed.

6 Claims, 2 Drawing Sheets

OVERALL SYSTEM CONFIGURATION

OVERALL SYSTEM CONFIGURATION

METHOD AND SYSTEM FOR FIXED ODDS EXOTIC AND STRAIGHT BETTING WITH PARI-MUTUEL RULES

CROSS REFERENCE TO RELATED APPLICATION

This application claims the benefit of U.S. Provisional Patent Application No. 60/903,968 filed Feb. 28, 2007 the entirety of which is hereby incorporated by reference into this application.

BACKGROUND OF THE INVENTION

1. Field of the Invention

The invention relates to a system and method for administering gambling or betting, and more particularly to the administering of exotic bets, which generally involve selecting the winners of multiple events, or the order of finish of multiple contestants in a single event.

2. Description of Related Art

Gambling or betting on outcome of events is an organized activity in many parts of the world. For example, betting on horse races is popular in many parts of the world, including the United States. Legalized gambling on sports events is commonly referred to as "sports betting." Events wagered upon need not be sporting contests, but may be any type of contest, such as an election, outcome of a television show, etc. Discussed in the context of horse racing, common types of bets include: selecting the winner of a race, a horse finishing in first or second place (i.e., place betting), or a horse finishing first, second or third (i.e., show betting). U.S. Pat. No. 5,842,921 issued to the inventor of this application describes the system and method provides for betting on the outcomes of sporting contests or events therein before the contest is complete. Incoming bets may be placed in a queue before being processed, and their effect on pool balance evaluated before accepting or rejecting the bets. Bets in the queue may be accepted only in matching sets on all of the participating contestants, so as to prevent any imbalance of the betting pool. Alternatively, the bets may be rejected with an indication of the change in betting terms which would be required if the bets are to be accepted. Bets may be placed on the finishing order of the contestants, such that there will be multiple winning bets for a single contest. This system and method can also be used to play games, where the contestants do not incur actual financial obligations. Another popular class of wagers generally referred to as "exotic bets". These generally involve selecting the winners of multiple races, or the order of finish of multiple horses in a single race.

It is desirable to provide a system and method for fixed odds exotic and straight betting with pari-mutuel rules.

SUMMARY OF THE INVENTION

The invention relates principally to exotic bets, although the techniques disclosed can also be applied to the common types of bets (e.g., win, place and show) to obtain a similar advantage.

The system and method disclosed facilitates betting that allows the punter, bettor or wagerer to know the fixed odds and/or payout that will be received on a successful bet if the wager is accepted, while also assuring that the betting pool created is a true pari-mutuel. The disclosed system and method also guarantees that there will always be at least one winner of the betting pool regardless of the number, pattern and distribution of the bets placed. The system's features, in ensemble, make horse race wagering a much more analytic sport, where betting skills bring significant rewards. It elevates horse race wagering to a level where risk can be properly evaluated in terms of potential gain and maximizes the likelihood that a bet will be accepted at the most favorable odds possible. The present invention defines the winner of the pool as the bet that "most correctly" selects the winning combination from among the bets entered into the pool, which might not necessarily be the actual winning combination in the race(s). Determining the most correct punter ensures there is a winner from among the bets placed.

The invention will be more fully described by reference to the following drawings.

DETAILED DESCRIPTION

Reference will now be made in greater detail to a preferred embodiment of the invention, an example of which is illustrated in the accompanying drawings. Wherever possible, the same reference numerals will be used throughout the drawings and the description to refer to the same or like parts.

The system and method of the invention maintains its own betting pools so any type of wager can be offered on any race being run live anywhere in the world. The pools offered can be much more comprehensive than those available at the actual horse track hosting the horse race and do not have to resemble the horse track pools.

Played on its most elemental level, the punter, bettor or wagerer need only select the track, race, bet type and horse(s) to place a bet on a computer screen, machine readable betting slip, or other input device. For the more analytic, the system can be queried and will promptly return data as to the current state of any betting pool that is open, such as, the number of units (or dollars) previously bet in a pool, current odds on any desired bet, odds history on that bet, limit book status with units (or dollars) at all limits on any bet, and much more. The system also allows a punter to query for all horse(s) selections that meet input criteria. For example, the system can be queried for the odds on all horses in a race(s), on exotic bets, if only a partial selection of the horses in the exotic bet are chosen, what the odds would be (i.e., potential odds) with other horses selected, all bets with odds above or below an odds criteria, and much more in a similar vein. The system can be instructed to automatically place bets meeting selected criteria in a current or future pool. The system can also be instructed to automatically place wagers on all horses meeting selected criteria when only partial selections of the total potential input criteria are made.

The only type of horse race betting that is generally legal in the United States is pari-mutuel betting. A principal purpose of the system and method disclosed herein is to insure that any wagering done in accord with the principles of the invention meet pari-mutuel rules. Thus the wagers offered by the system and method of the invention will be legal in states where horse race wagering is legal, and will also qualify for permission to be legally offered across state lines between states that allow pari-mutuel racing, under U.S. Federal law.

To qualify as a pari-mutuel, all of the money wagered in a betting pool (after the deduction of a fixed percentage for taxes, the horses, the track, etc.) must be paid out to the winner(s) of the wager, and the house retention must be the same regardless of which entry wins the race. The payout to the winner(s) must also be in the ratio of the money in the betting pool, after the subtraction of the fixed deductions, to the money bet on the winner, e.g., if there is $100,000 in the pool after deductions, and the money bet on the winner equals $10,000, then the winner(s) in ensemble receive $10 for each dollar bet, including the return of their original amount bet.

The main disadvantage of pari-mutuel wagering as is a commonly available in the United States is that the punter, bettor or wagerer does not know the odds that will be received if a bet is successful until after all of the bets on a race are accepted. Therefore it is not possible to make a well-reasoned judgment as to the equity of the reward for a successful bet in relationship with the likelihood of that bet being successful. This can only be determined if at least the approximate odds that will be received are known. This system meets that need by providing current odds data immediately, while also allowing the punter to specify the lowest odds that the punter will accept on a bet, and then satisfying that specification.

The same basic concepts and technology also apply to sports wagering on events other than horse racing, where predicting the outcomes of sporting events or aspects of an event are called for.

Exotic Bets

In an "n" horse race program, the punter, bettor or wagerer is asked to place a bet that correctly picks the winners of "x" consecutive races. Alternatively, the punter could be asked to place a bet that successfully picks the order of finish of the first "x" finishers in a single "n" horse race. The bet could even combine the two cases above; for example, the punter could be asked to select an order of finish in multiple races such as the first two races of a program.

As examples, with an 8 race program, the punter could be asked to pick the winner of the first 6 races (it could be, instead, 8 races, 4 races, etc., or selection of the winner of any number of races in a race program having some number of races,). Alternatively, the punter could be asked to name the order of finish of the first five finishers in a 10 horse race (it could be, instead, the order of finish of the first 2, 3, 4, etc, finishers). For instance, the punter could select the first two finishers in the first two races. The punter could be asked to name the order of finish of any number of finishers for any number of races.

A major problem with exotic bet pools is that if there isn't a great deal of liquidity in the wagering market, then it is possible that no punter will have placed a bet on the winning combination of horses. This is because the number of possible pool outcome combinations increases rapidly with the number of races and horses. For example, if the bet is to select the winners of 6 races, each of which have 10 horses, there are (10^6) 1 million possible combinations. Thus, in the simplest case of a single bet on each combination, there would still have to be one million bets placed to ensure that the winner was selected. In actual practice, many more bets would have to be placed to ensure a winning punter because the better (i.e., more capable and attractive from a betting perspective) horses would attract greater interest than the less capable ones and so more total bets would have to be placed to make it probable that the less capable horses would have support from a punter, even at the higher odds the less capable horses would offer.

The present invention solves the liquidity problem by defining the winner of the pool as the bet that "most correctly" selects the winning combination from among the bets entered into the pool, which might not necessarily be the actual winning combination in the race(s). By way of explanation, the term "most correctly" means the bet that most closely names the winner of a race(s), or most nearly predicts the order of finish. Thus, if no punter(s) successfully picks the winner of a race, the punter(s) who selects the horse that finishes second has most correctly picked the winner of the race (and similarly, if no punter had selected the horse finishing first or second, the punter picking the horse finishing third would be most correct). Likewise, if no punter selects the horses' exact order of finish (i.e., no punter selected the horse finishing second when the bet was to pick the first four finishers) the punter(s) who had selected the first, third, fourth and fifth finishers would be the most correct.

The reason for declaring the most nearly correct punter to be the winner is to ensure that there is a winner from among the bets placed. The most nearly correct is indeed the "winner" among the eligible bets (i.e., the group of placed bets). This is similar to a horse finishing second in a race being declared the winner when the winner is disqualified, the second finisher being the horse finishing first among the remaining eligible contestants in the race after disqualifications.

U.S. Pat. No. 5,842,921, which is incorporated herein by reference, discloses the system and method for a wagering at fixed handicaps and or odds. While the method of that patent is different from the present invention, that patent discloses a schematic system diagram in which a central processing unit is programmed to provide the method of the patent. The central processing unit can be programmed alternatively to provide the fixed odds exotic and straight betting with pari-mutuel rules of the present invention.

Figure 1:
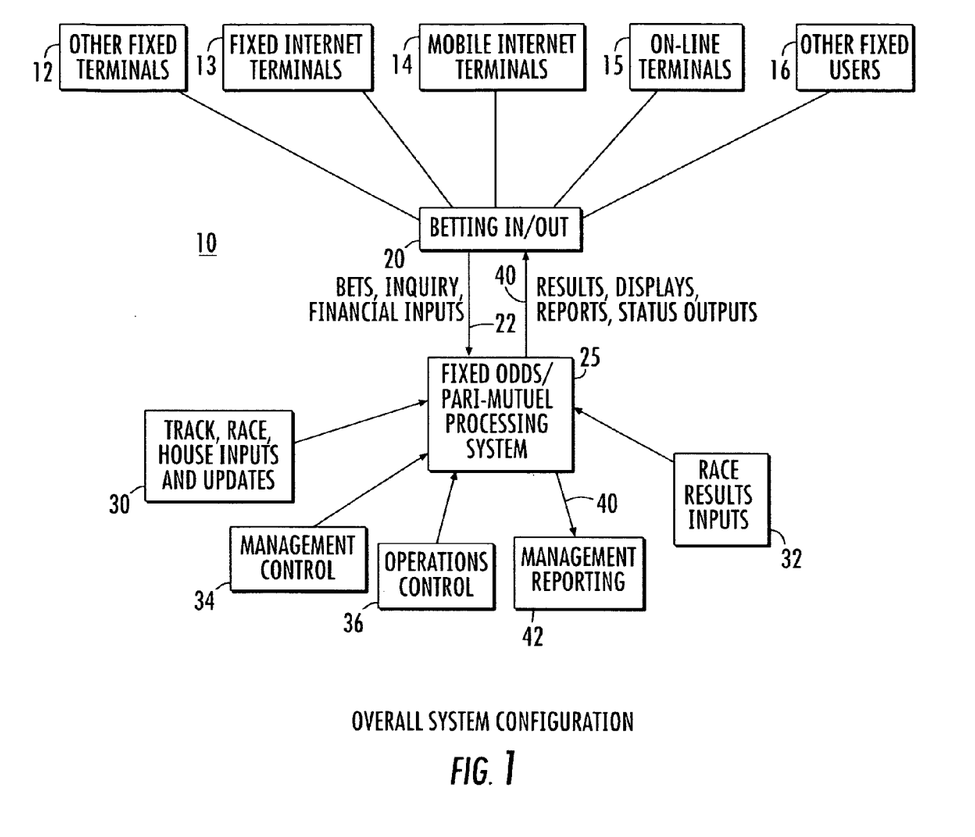
FIG. 1 is a schematic diagram of a system for fixed odds exotic and straight betting with pari-mutuel rules.

In system 10 of the present invention shown in FIG. 1, betting terminals and betting stations, such as fixed users 12, fixed internet terminals 13, mobile internet terminals 14, on-line terminals 15, and mobile users 16 could be local devices connected via hard wire, devices connected via a local area network, devices connected via a common carrier network, devices connected over a wireless network or the internet. Such terminals and stations may have various payment capabilities such as credit, cash or tokens and may also have displays which show odds, payouts, contestants, or other information having to do with the details of the wagers being placed. These and/or other terminals can optionally be used as payment terminals to reimburse winners.

Computer terminals 12-16 interface with system in/out device 20. Inquiries such as available bet types, tracks, races, horses, odds, pools, and the like, and inputs of bets to be placed, are received by system in/out device 20 and passed to the pari-mutuel processing system 25. System in/out device 20 also provides the player terminals with data such as bet status, race results, payouts, player account status, and the like, through output 40 in response to inquiries. In a common example, the terminal screen can show track, race(s) and bet type buttons. Selecting one or more of those items brings up list boxes showing the possible selections. If bet type is selected first, the system can show in the list boxes for track and race(s) only those that accord to the specified bet type. The screen can also have a series of standard buttons which allows input criteria to return horses or bets meeting those criteria. For example, all horses having odds meeting an input criteria, all bets which meet a criteria, pool status, horse or bet status, bet history, current odds and the like. Input to system 10 from graphical user interface 20 presented to the user can be via touch screen, keyboard, mouse, electronic pointer and the like. Input can also be provided to the system via telephone key pads, voice recognition equipment or any compatible input device.

Other input devices, such as machine readable bet slips, keypads, manned terminal, etc. can also be used, although they may not be able to readily provide the same range of interactive inquiry or automatic execution features. Bet receipts can also be provided detailing the selections made by the punter.

Fixed odds pari-mutuel processing system 25 can be a central processing unit, which also incorporates known hardware and software technology. For example, the central processing unit could, depending upon the specific size of an installation, use a a single or networked configuration of standard desktop or rack-mounted computers or network servers powered by chips from INTEL®, Advanced Micro Devices and the like. Units typically manufactured by companies such as IBM®, DELL™, Hewlett-Packard, and others, are entirely suitable. Similarly, disk storage systems and flash memories from firms such as IBM, HP, Sony and others, and laser storage systems and high density DVDs such as those from Sony, are entirely adequate for the needs of the system.

Fixed odds pari-mutuel processing system 25 receives input data 30 on track, race and horse(s) race results inputs on line 32. Management control 34 and operational control 36 can be determined by the method of the present invention described below. Outputs 40 can be presented to management 42. Outputs 42 can also be presented through graphical user interface 20 to the betting terminals and betting stations 12-16.

Figure 2:
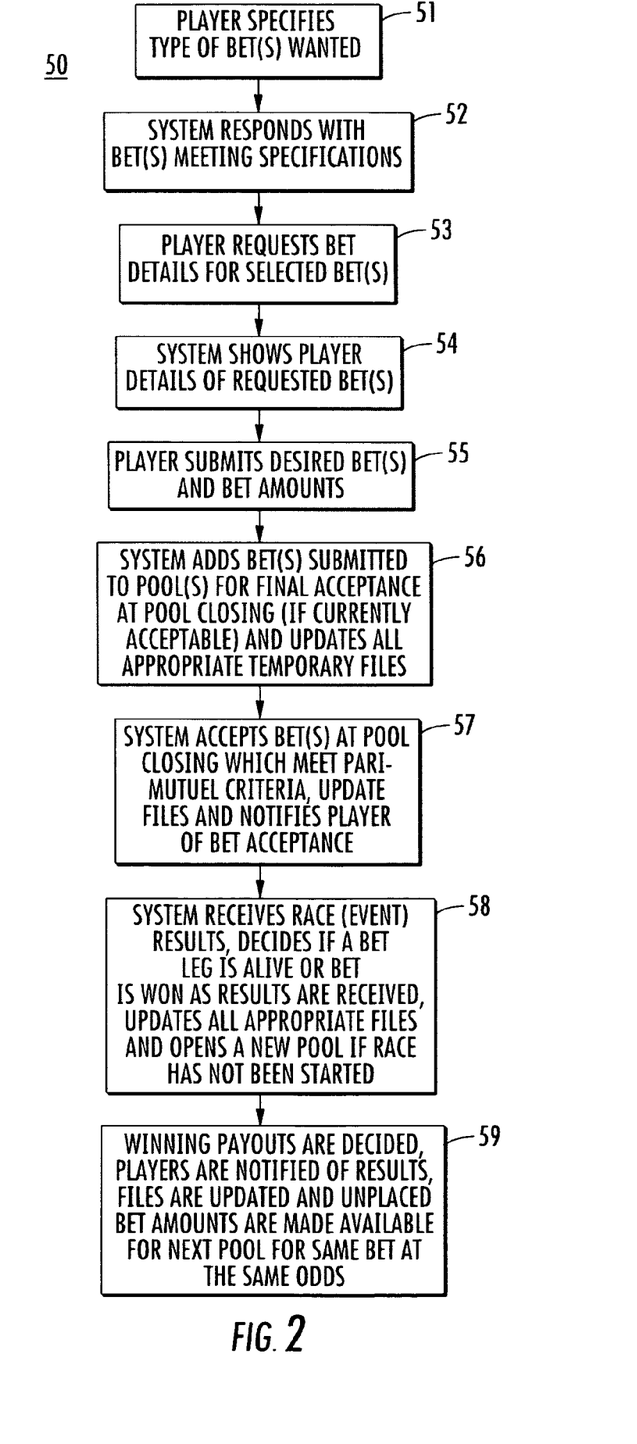
FIG. 2 is a flow diagram of a method for fixed odds exotic and straight betting with pari-mutuel rules.

FIG. 2 is a flow diagram of method 50 for fixed odds exotic and straight betting with pari-mutuel rules. In block 51, the player requests the type of bet(s) he would like. The system in block 52 responds with bets meeting the specifications. In block 53, the player requests bet details (horse(s), odds, and the like) for selected bets. In block 54, the system supplies the requested data. In block 55, the player inputs desired bets and bet amounts. As examples, players enter bet type exacta, Pick 6, etc., and the appropriate track, race(s), horse(s) and the desired bet amount. List boxes can be used to facilitate the players entries. Betting opportunities are displayed by bet type. For example, tracks within bet type, race(s) within tracks. Where multiple betting propositions meet the criteria requested, they are shown in order of race starting times. In response to player requests for bet details, in addition to track, race, horses, the system supplies quantitative data such as current odds, estimated odds, number of previous bets on the specific betting proposition and in the pool, race time, and the like.

In block 56, system 10 adds the bets to pari-mutuel queue for potential acceptance when pool closes and updates all appropriate temporary files. If a bet amount exceeds the maximum available for pool, system 10 retains excess and attempts to enter in a subsequent pool for the same bet at the same odds up to the total amount specified in the submitted bet. All bets are placed on the queue with the priority of receipt and acceptance criteria obeyed. Bets in the queue which no longer meet the current acceptance criteria, having been replaced by bets which will accept lower minimum odds, are removed from the bet queue and placed in the queue for possible acceptance in a subsequent pool for the same bet at the same odds. Bets on this queue obey the same system priority criteria. All appropriate files: player's available balance, estimated odds, bet total, pool total, and the like are updated. In block 57, bets are accepted at pool closing which meet pari-mutuel criteria, players are notified and files are updated.

In block 58, system 10 resolves bets based upon race results received using winners' selection criteria algorithm for the "most correct" finisher and progressive pool winners if appropriate. System 10 updates all appropriate files and opens a new pool if the race has not been started. In block 59, winners' payouts are decided and distributed. All players, pool, system, management, accounting and the like files are updated. Unplaced bet amounts are made available for the next pool for the same bet at the same odds.

Bets at a lower odds limit have priority over those with higher limits. For bets at the same odds limit, earlier bets have higher priority. Market bets always have priority over limit bets, with earlier ones having priority over later market bets and they are always accepted if the pool is open.

In one example, given the bet is to pick the winners of the first six races and there are ten horses in each race, system 10 will keep in a matrix an accumulator for every possible combination of the ten horses in the six races, a total of 10 to the $6^{th}$ accumulators, which will sum the pari-mutuel amount (i.e., the amount bet less the house retention) on each possible combination (mathematically for bets such as an exacta or trifecta when it really is a permutation as the order of finish matters). Simultaneously, system 10 will keep as a running sum an amount indicative of the total pari-mutuel amount in the entire betting pool from all of the combinations that have received bets. System 10, to minimize the size of the sums stored, and simplify the bet process, might only allow bets in multiples of a unit bet size (i.e., the smallest bet accepted), and keep a running total of the number of unit pari-mutuel amounts accepted on both the permutations and in the total pool. Instead of a matrix of accumulators, system 10 may store bets and amounts bets using various alternative means such as a data structure of pertinent variables with entries in a linked list.

For example, when the unit bet size is $5 and the retention is $1 (20%), if the system accepts a bet of $10 (2 units) as being above a player's specified minimum odds, $10 will be accumulated for the bet combination and $8 for the pool, since the retention is the bet amount that is not returned to the winners, but retained by the operator. At that time (actually before the bet is entered into the system) the player can be shown the current odds for the bet from the total amount that will be accumulated when his bet is entered for the combination and the known amount (total amount bet in the pool less the retention) when the pool will close. All of the pools must reach a known, preset size or else they will not close and the bets submitted are returned to the players. The odds are merely the total amount in the completed pool (total amount bet in the pool less the total retention,) divided by the total amount bet on the winning combination. Consider as an example that a punter bets $10 (2 units) in a Pick 6 pool, where the challenge is to pick the winners of six specified races. If the total pool is set at 1,000 units, the amount bet will be $5,000 and the payoff amount in the pool will be $4,000. If the punter in our example had bet 2 units and picked horses 5, 8, 2, 2, 1, 4, and other punters had bet 8 units on the same combination, there would be $50 bet on the combination and $4,000 to be paid out to all of the winners. The winning odds for each unit bet therefore is 80/1. Since a unit bet is $5, each winning unit will receive $400, and the punter in our example, who had bet 2 units, would receive $800. If there also had been a progressive pool, discussed elsewhere herein, the money wagered in that pool would be separately accumulated and would be paid out when there was a winner(s) who had correctly selected the exact winning horses, not merely the closest selection, in an identical manner.

Determining Winners

Bets are divided into two categories: "live" and "dead." A live bet is one that has selected the winner in each race that has been completed correctly, or the order of finish thus far, correctly. A dead bet is one that did not correctly select the winner of the last race completed or last horse to finish. Live bets are still eligible to win the pool; dead bets can no longer win the pool. Our definition of the "winner" of a single leg in the pool is the wager(s) that selects the horse winning among those in the pool (i.e., the most nearly correct selection). If no punter(s) picked the horse winning a leg of a bet correctly, then the punter(s) who picked the horse next closest to winning that leg is declared the winner of that leg. If no punter picked the first or second horse, the punter(s) picking, sequentially, the third, the fourth, etc, would have the winning horse in that leg in the pool. Even if the only horse picked came in last in the race, that horse, since it is the only one selected in any live bet in the pool is the winner for the leg of the bet.

The same logic applies to the order of finish in a single race, i.e., if the first three finishers need to be selected and no punter picked the horse coming in first, second and third, then the punter who picked the horses coming in first second, and fourth is the most nearly correct, and the winner of the leg. The same logic applies if there is no correct winner selected for several legs in the order of finish. Note also that after a bet does not have the "winner" according to our definition, on a single leg of the bet, the bet is dead, and can not any longer win the pool, regardless how its remaining selections of horses finish compared to the horse(s) selections of "live" tickets. The second, or third, etc, place finisher could, theoretically, be the winner(s) in every race on the winning ticket, for the purpose of designating the winning ticket. Since every accepted ticket must have a horse selected in every race or order of finish, there must always be a pool winner(s). The "live/dead" ticket algorithm is the preferred, but not the only algorithm which could be used to select the "most nearly correct" winner. Another might bet the player who has the greatest number of winners selected, i.e., 5 out of 6, 4 out of 6 and the like, if no ticket has all correct winners.

As a variation upon the method of selecting the winner described above, a percentage of the payout to a winner who was closest, instead of predicting the winner exactly, could be held out from every sequential pool that did not have an exact winner, and be accumulated until an exact winner was predicted. The total so accumulated could then be paid out as a bonus to the punter(s) that first predicted the winner exactly. In that manner a progressively increasing payout could be achieved and there could be an advantage to predicting the winner exactly.

Calculating The Odds/Payout

The system can know essentially constantly the pari-mutuel payout on every conditionally accepted bet if a bet just placed is the last bet in the current pool. Therefore, a punter can be informed what the pari-mutuel payout will be if a contemplated/placed bet is the winning bet based upon the current state of the pool. An accumulator for each possible permutation of bets can be established and can be set up in a matrix. The amount bet on each permutation, and the total bet across all permutations in the pool need only be constantly up-dated as bets are accepted. The total payout is then simply determined from the ratio of the money wagered divided by the money bet on all of the winning tickets, of course subtracting the money for the state, track, horses, etc. However, to be pari-mutuel, the pool must be divided among the players who have the winning tickets, the dollar payout divided among the punters who have winning tickets in the ratio of the money they bet. The system, since it keeps running totals, can also give the odds/payout on any horse in any race at any time, based upon the bets already received, which is accurate if the betting pattern remained identical and should usually be quite accurate if the sample size at that time is significant. Odds and payouts can be displayed to the punters to assist the placing of bets for the entire race card.

Use of Multiple Pools

A means for minimizing the delay in informing the punter what his winning odds/payout will be is to employ multiple, sequential pools, each of which will have its own winner(s). It is desirable, but not necessary, that these pools close rapidly, say every minute or so, until the race program starts so the odds/payout that are calculated can give a good representation of the current sentiment of the punters after a short delay to receive the bets. The size chosen for a pool could vary with the size of the volume expected on a bet type for the race. It could be larger when a larger betting volume was anticipated and less when a smaller one was expected. But, of course, pool size could and probably would be kept constant at the same track for the same bet type in order to maintain consistency. Setting a known pool size and closing the pool when that size is reached is a key feature of the system. Because if the eventual size of the pool is known, along with the amount bet on a given entry, the exact current odds can be known on any entry. Furthermore, the payout on any specific bet can also be known, if the bet is accepted, from the ratio of the size of the bet to the sum of all bets on the same entry. If a pool is not completed, all bets are returned from that pool when betting is closed.

In this system, the odds/payout in each pool for the same combination might differ as the betting sentiment changes over time. This is similar to the rapid changing of prices for the same security in financial markets as short-time demand changes, but nothing has changed in the announced underlying value of the entity that the security represents. The pools could each be set to close when they have received a set amount wagered. For example, if the unit bet was $5 and the pool total was set at $5,000, the pool would close after 1,000 bets were received. At other times, the pool total could be set at some other amount, for example $10,000, and close after the corresponding number of bets, in this case 2,000, were received.

As the number of bets accepted in a poll is reduced compared to the number of potential pool outcomes, the probability of receiving an exact winning bet tends to decrease. It therefore becomes less advantageous to make multiple unit wagers in the same pool as the likelihood of a permutation being unique increases, and so there is no advantage in betting a larger amount on a winning unique permutation because the payout is fixed. Of course, making multiple bets on the same permutation in a single pool will result in the punter receiving a larger percentage of a potential payout if the permutation wins, albeit at lower odds on each bet.

For example, if the unit bet was $1 and a punter was the only one placing a wager in a pool ultimately reaching $1,000, that punter will receive odds of 1,000/1 if the bet is successful. If the punter were to make a second $1 wager, still being the only punter selecting that permutation in a pool reaching $1,000 when closed, he/she would receive the same $1,000 payout, or odds of 500/1 on each bet. Of course, if a second punter placed a unit bet on that same permutation for two total units bet, each punter would receive one half of the payout, or odds of 500/1. If one of the two punters placed a second unit bet on that permutation, the resulting odds received on each bet are reduced to 333/1, but the punter with two bets would receive ⅔ of the payout. It is questionable if such a strategy is desirable because the punter would lose twice as much as if the bet was not successful, but only gain ⅓ more if the bet is successful.

It appears that a better strategy is to bet larger bet amounts by placing sequential wagers in the successive pools, although the punter will not know with certainty what odds will be available in subsequent pools. Having multiple pools also induces punters to bet in a more uniform manner over time instead of at the latest possible betting time just before the start of the first race in a bet, when the pool odds are better known, as in conventional single pari-mutuel pools. This is because each pool will have its own odds; the odds in subsequent pools might be lower. Since the pools are small, and they close without warning, waiting will often result in being unable to get a bet accepted in a pool, or the desired bet total from wagers in multiple pools. Placing only unit bets tends to be standard behavior, at least in the case of large payout exotic pools, much like single selections in a lottery. Bets up to a limit set by the punter can be automatically entered to sequential pools to assist bet placement.

Tracking Punter's Wagers

As each bet is accepted, it is recorded and the amount bet on the entry is accumulated in a matrix covering all of the potential combinations for the number of races and the number of entries in each race. For example, if there are 6 races with 10 horses in each race, there are 10 to the $6^{th}$ combinations. Of course, if there are only 10,000 or even 100,000 bets in the pool, only a small number of possible winning bets/combinations/tickets will have bets on them. Considering that many entries will be included in multiple bets (some horses will have more support than the average,) the number of entries without support will increase even more. The method and system of the invention guarantees that there will always be a pari-mutuel winner.

Market And Limit Bets

Consider the case that the bets are constrained to a single unit size, say one dollar. Since there is a constant $1,000 in each pool, the first bet on a horse, should it win, will pay $1,000, including the bet amount, divided by $1, or 1,000 for 1 (true odds of 999/1). If there were two bets on that horse or permutation, each bet would pay back $500; 4 bets, $250 each; and so on. In this case it becomes somewhat less desirable to make bets larger than one unit as the punter will receive back, if successful, less payout per bet. As discussed above, this is somewhat more complicated, depending upon the number of bets on a single horse, or permutation, as the punter will still receive a larger share of the $1,000 payout if betting more than a single unit (except for the case where he/she is the only bettor on the permutation).

Since the odds/payout might change even over the short duration of the pool, it is desirable to give a punter a better indication of his odds/payout than the current odds when the bet is accepted. This can be done by allowing "limit" bets, as all pari-mutuel bets are, in essence, "market" bets because they pay a price determined by the overall market for that permutation when the pool closes. Therefore a punter can be allowed to designate a wager as a limit bet, which means that if the bet is accepted and successful, the bet will payout at the limit, or higher. All bets could be designated as market or limit when placed or all bets could be market bets if not designated as limit bets or visa-versa.

Bets would be accepted to the pool in order received, up to a fixed total, $1,000 in our example. All bets, market and limit, would be put into the same pool, except that the limit bets would be provisional and would be removed when the odds/payout is reduced below the punter's limit as subsequent bets on the permutation are accepted. Note also that a limit bet can have greater odds/payout than the limit, as in the case where the limit is lower than the current market when the limit bet is placed, and later bets do not reduce the odds/payout to the limit. Thus, the punter can specify the exact lowest fixed odds/payout he will accept for his winning bet, but he/she is not guaranteed that the bet will be accepted.

Market bets that up the pool total are always accepted. Market bets can have priority over limit bets regardless of the order of receipt. Limit bets at the same limit can have priority based upon the order of receipt. Limit bets with lower limits can have priority over higher limit bets, regardless of order of receipt. It is possible therefore that a lower limit bet placed after a higher limit bet will cause the higher limit one to no longer be within its limits and be removed from the pool, but when the higher limit bet is removed, the lower limit bet will still be in the money at the limit of the higher limit bet whose limit caused its own removal from the pool. For example, if there are four bets, all at a limit of 250/1, and those are the only bets on that entry, they will all be in the money and remain in the pool. Should a subsequent bet at a limit of 250/1 be placed, it will not be accepted. However, a subsequent bet of 200/1 will be accepted as it will be the fifth bet in the pool on that entry, the five bets setting the odds/payout for that particular wager at 200/1, the limit established by the fifth bet when placed. However, with the addition of the fifth bet, the payout is reduced below the limit set by the limit bets at 250/1. But what will happen is that a single 250/1 will no longer be in the money; according to the rules, the last 250/1 received. When that last received 250/1 limit bet is removed, there will again be only four bets in the pool on that entry so, the 200/1 bet will payout at its limit of 250/1, since the limit is the minimum odds that will be accepted, not the maximum, and the first three 250/1 limit bets remain in the pool. While this rule may seem complicated it is entirely logical and will generally not be consideration in placing bets, except by sophisticated punters, who seek small edges, as they do in all but the simplest, most automatic forms of wagering. Horse wagering lends itself to a great deal of analysis and sophistication and this wrinkle accommodates that, for those who are so inclined.

Note also that this system encourages betting early in the pool because early betting provides greater assurance that a bet will be accepted as the punter does not know when the pool will close. Also, bets are accepted in the order received, so bets entered at the same limit as a previous one will be removed after the first one reaches the limit, as accepting an additional bet reduces the odds/payout for that permutation.

As there are multiple pools in a race, each of which might have different odds/payouts, it is necessary for the punter to know in which pool his bet is included. The pools will be identified by race (or group of races) and pool number. A new pool opens immediately after one closes so there is always a pool to bet in to, until shortly before the race starts.

To encourage punters to bet early in a pool, so realistic odds will be available soon after a pool opens, it might be desirable to allow the first group of punters making bets (e.g., punters placing bets in the first 30 seconds after a pool opens, unless the pool closes sooner; the punters placing the first 50% of the units to be included in the pool or some other first grouping of punters) to change a market bet to a limit bet that is still in the money (still above the limit) at any time that the pool is still open. For example, an early market bet may be allowed to be changed to a limit of 200/1 when there are four bets on an entry as it is the fifth and in the money at 200/1. The standard rules of bet replacement, described above, can be applied for the new market bet, which may also be permitted to keep the priority provided by the receipt time of its initial entry as a market order at its newly entered limit. This feature allows the early punter to get more data at a later point in time, the reason that punters wait until later to place a bet, and the pool will not lose any bets because a bet can only go out of the money if it is replaced by a later limit bet in the money. This early priority and later opportunity to set a limit is a great advantage and is expected to encourage very heavy early wagering, stabilizing pool odds rapidly. This feature is an optional system characteristic.

The combination of multiple pools, limit orders and early betting preferences allows punters heretofore unavailable scope for intelligently selecting horses based upon the odds that will be offered and the flexibility to use that information for great advantage. This system makes horse race wagering a more analytic sport.

Variable Bet Sizes

In this system, with its fixed pool sizes, the making of bets larger than one unit is of dubious value. While the punter's share of a winning pool will increase as his percentage of the winning amount bet increases, since the total winning payout remains the same, the odds on each of the punter's bets decreases. Therefore, the only way for a punter to increase winnings without reducing the odds on an individual bet is to make the same bet selection in multiple pools, which the system of the invention allows and can even accommodate in an automatic mode by entering identical bets up to a preset limit in sequential pools.

One method for allowing bets of variable sizes without decreasing the odds received is for the system to permit fractional bets that have to be accumulated up to the unit bet size before the system will accept them. For example, the system could allow decimal fractional bets and accumulate fractional bets until the total equaled a single unit bet, which would then be entered into the pool. This is similar to how odd-lot stock sales are made. Any fraction of a unit left over could be rejected, or be accumulated over all of the pools and be added into the pool open at the time it becomes a full unit, with any fraction remaining discarded when betting on the last pool in the race(s) closes.

It is also possible for the system and method to include the partial bet left over if desired. Such a feature works in the following manner. Consider the case where the unit bet is $10 and the fractional bets are multiples of $0.10 (it is possible that all 100 possible combinations might not be allowed, for simplicity). If the pool is again 1,000 bets, then the payout is $10,000. To this must be added the amount of the leftover fraction that is being included in the pool. Note that the largest fraction is 99 bets ($9.90), so it is less than 1 part per 1,000.

There are three cases of interest to consider on payout: only a winning fractional bet(s), some winning unit and fractional bets and no fractional bet winners. Consider the payout cases in order. Recall also that the largest total payout cannot exceed $10,009.90 (i.e., there cannot be fractional bets totaling more than $9.90 in a pool).

If only fractional bets win, the winning fractional bets are only entitled to receive that fraction of the payout that their bets represent. Let us say that there were 2 fractional bets of $0.10 and $0.30 so that the payout in this case is $10.000.40. The fractional bets would represent 4/100 of the winning payout, or $400.016 (10000.40*0.04 with rounding to favor the track, all calculation rounded down to the next complete unit of $0.10). Winning fractional bets would therefore payout $100 and $300 respectively based upon the amounts bet (there is $0.016 rounding/breakage). The remainder ($9,600) would be paid out to the next closest winner(s), according to the payout rules.

If there are unit bet and fractional bet winners, the winning payout is divided into portions equal to that of a single smallest fraction, and then each winner is paid out that portion multiplied by the number of unit fractions it equals. For example, say the winning bets were 2 unit bets ($10.00 each) and 2, $0.20 fractional bets. First, the total payout is $10,000.40 because the fractional bet total is added to the nominal $10,000 pool payout. The smallest fractional bet is $0.20 and a unit bet represents 50 of those smallest fractional bets. Thus, the payout for each smallest fractional bet is then $98.04 ($10,000.40/(50+50+2)). Each fractional bet gets $98.00 for a total of $196.00 and the unit winners would split $9804.32, receiving $4904.10 each, with $0.20 accounted for in rounding/breakage.

If there are only unit winners, each receives a equal portion of the pool For example, if there were 4 unit winners, with $9.90 in fractional bets, each unit winner would receive $10,009.90/4, or $2,502.40 each, with $0.30 lost to rounding/breakage.

Input Design

The present invention is described with reference to methods, apparatuses (i.e., systems) and computer program products according to illustrative preferred embodiments of the invention. This invention may, however, be embodied in many different forms and should not be construed as limiting to the embodiments set forth herein; rather, these embodiments are provided so that this disclosure will be thorough and complete, and will fully convey the scope of the invention to those skilled in the art. It will be understood that each step of the method, and accommodations for each step of the method, respectively, can be implemented by computer program instructions. These computer program instructions may be loaded onto one or more general purpose computers, special purpose computers, or programmable data processing apparatus to produce machines, such that the instructions which execute on the computers or other programmable data processing apparatus create means and apparatuses for implementing the functions specified. Such computer program instructions may also be stored in a computer-readable memory that can direct a computer or other programmable data processing apparatus to function in a particular manner, such that the instructions stored in the computer-readable memory produce an article of manufacture including instruction means that implement the function specified.

According to one aspect of the present invention, the invention may comprise software products for generating graphical user interfaces. Therefore, it will be understood that each graphical user interfaces may be implemented by computer program instructions. These computer program instructions may be loaded into a general purpose computer, special purpose computer or other programmable data processing apparatus to produce a machine, such that the instructions which execute in the computer or other programmable data processing apparatus create means for implementing the functions illustrated by and described with reference to the illustrative user interfaces provided herein.

The computer programmable instructions may also be stored in a computer readable memory that can direct a computer or other programmable data processing apparatus to function in a particular manner, such that the instructions stored in the computer-readable memory produce an article of manufacture including instruction means that implement the functions illustrated by the interfaces. The computer program instructions may also be loaded onto a computer or other programmable data processing apparatus to cause a series of operational steps to be performed on the computer or other programmable apparatus to produce a computer implemented process such that the instructions that execute on the computer programmable apparatus provide steps for implementing the functions described herein.

Unless explicitly stated, the method embodiments described herein are not constrained to a particular order or sequence. Additionally, some of the described method embodiments or elements thereof can occur or be performed at the same point in time.

Applications Other Than Horse Racing

This same system and method can be applied to sports, stocks or bonds, or other betting opportunities in which a pari-mutuel odds/payout system is desired. Pari-mutuel systems are very desirable for the house (i.e., person accepting the bets and agreeing to pay the winning punter(s) as such systems can not ever have any losses in a pool, which is very possible in fixed odds betting when a pool is unbalanced. Thus, since system and method of the invention includes many of the features of a fixed odds/payout system, it will have great appeal to a market maker, yet still appeal to a punter, even if a pari-mutuel were not mandated.

As an example of a sports betting system, consider that there are 15 NFL games 17 weeks of the regular season in which one team competes against a second team. A bet could be to select the winners of each game a particular week, with or without odds on each particular game. The punters would select either side for the 15 games of the week. There would be sequential pools of, say, 10.000 bets of $5 each, for a $50,000 payout. The odds/payout amounts to the winners would be determined as with horse racing. Since there are 32,768 possible combinations (2^15), many combinations will have no bets. Some bets, particularly those selecting all favorites will have many bets and will pay small payout amounts, relatively. Those punters selecting long shots that win will receive significantly higher returns on their bet. Since the system provided is a pari-mutuel, the house commission is fixed and the same limit/market features could apply to this embodiment of the system and method.

In other sports wagering examples, bets could be to predict if there would be a first down on the next play in football, or if the next batter would make an out, or reach first, second, third or home base (five potential outcomes) in baseball. The odds/payout on these outcomes would be determined by a pari-mutuel exactly as in the horse racing example, with the punters selecting the outcome that they predicted, and most nearly correct criteria being used to determine the winner if the actual outcome was not selected. The multiple fixed pool sizes could be employed, as could the market and limit bet type bets, and other features of the system describe above, etc.

It is to be understood that the above-described embodiments are illustrative of only a few of the many possible specific embodiments, which can represent applications of the principles of the invention. Numerous and varied other arrangements can be readily devised in accordance with these principles by those skilled in the art without departing from the spirit and scope of the invention.

What is claimed is:

1. A computer-based data processing method for providing pari-mutuel gambling with guaranteed minimum odds and known exact current odds on a wager or an event having a plurality of potential outcomes and an actual outcome, the method comprising the steps of:
   providing data to the first user as to a current state of any pool that is open, the first user determining the criteria of the first bet from the data;
   providing data to the second user as to a current state of any pool that is open; and the second user determining the criteria of the second bet from the data;
   a first user selecting criteria of a first bet;
   automatically placing the first bet if the selected criteria of the first bet meets a predetermined selection criteria, accepting the first bet, the first bet selects a first combination of the plurality of potential outcomes;
   a second user selecting criteria of a second bet, automatically placing the second bet if the selected criteria of the second bet meets the predetermined selection criteria,
   accepting the second bet that selects a second combination of the plurality of potential outcomes; and determining a winning bet from among the first bet and the second bet, wherein the winning bet most correctly selects the actual outcome of the event from the closest said selecting criteria of first and second bet by the users regardless of the exact winning outcome or not.

2. A computer-based data processing method for providing pari-mutuel gambling with guaranteed minimum odds and known exact current odds based upon a wager comprising multiple events on a series of events, each event having a plurality of potential outcomes and a single actual outcome, the series of events having a series of actual outcomes, the method comprising the steps of:
   providing data to the first user as to a current state of any pool that is open, the first user determining the criteria of the first bet from the data;
   providing data to the second user as to a current state of any pool that is open; and the second user determining the criteria of the second bet from the data;
   a first user selecting criteria of a first wager;
   automatically placing the first wager if the selected criteria of the first wager meets a predetermined selection criteria;
   accepting a first wager representing a first selected series of potential outcomes;
   a second user selecting criteria of a second wager;
   automatically placing the second wager if the selected criteria of the second wager meets the predetermined selection criteria;
   accepting the a second wager, the second wager representing a first selected series of potential outcomes; and
   determining a winning wager, wherein the winning wager most correctly selects the series of actual outcome of the series of events from the closest said selecting criteria of first and second bet by the users regardless of the exact winning outcome or not.

3. A computer-based data processing method for providing pari-mutuel gambling with guaranteed minimum odds and exact known current odds, the method comprising the steps of:
   providing data to the first user as to a current state of any pool that is open, the first user determining the criteria of the first bet from the data;
   providing data to the second user as to a current state of any pool that is open; and the second user determining the criteria of the second bet from the data;
   a first user selecting criteria of a first wager;
   automatically placing the first wager if the selected criteria of the first wager meets a predetermined selection criteria;
   accepting a first wager representing a first selected series of potential outcomes;
   a second user selecting criteria of a second wager;
   automatically placing the second wager if the selected criteria of the second wager meets the predetermined selection criteria;
   accepting the a second wager, the second wager representing a first selected series of potential outcomes;
   accepting a pool of bets from the first and the second user if selected criteria of the bets meet a predetermined selection criteria, wherein each bet represents an expected outcome from a series of events; and determining a winning bet from pool of bets, wherein the winning bet most closely selects the actual outcome of the series of events from the closest said selecting criteria of first and second bet by the users regardless of the exact winning outcome or not.

4. A computer-based data processing system for pari-mutuel betting with guaranteed minimum odds and exact known current odds on an event or series of events, the system comprising:

a central processor for processing data;

storage for storing data; and an input device for inputting data, the data is a wager combination representing an anticipated outcome of the event or series of events having a plurality of potential outcome combination;

the system is configured to provide data to the first user as to a current state of any pool that is open, the first user determines the criteria of the first bet from the data;

said system further configured to provide data to the second user as to a current state of any pool that is open; and the second user determines the criteria of the second bet from the data;

a first user selects criteria of a first wager;

automatically placing the first wager if the selected criteria of the first wager meets a predetermined selection criteria;

said system accepts a first wager representing a first selected series of potential outcomes;

a second user selects criteria of a second wager;

automatically placing the second wager if the selected criteria of the second wager meets the predetermined selection criteria;

said system accepts the a second wager, the second wager representing a first selected series of potential outcomes; and first means for calculating a winning wager combination, wherein the winning wager most correctly selects actual outcome combination relating to the series of events from the closest said selecting criteria of first and second bet by the users regardless of the exact winning outcome or not.

5. A non-transitory computer-usable medium having computer readable instructions stored thereon for execution by a processor to perform a method comprising the steps of:

providing data to the first user as to a current state of any pool that is open, the first user determining the criteria of the first bet from the data;

providing data to the second user as to a current state of any pool that is open; and the second user determining the criteria of the second bet from the data;

a first user selecting criteria of a first wager;

automatically placing the first wager if the selected criteria of the first wager meets a predetermined selection criteria;

accepting a first wager representing a first selected series of potential outcomes;

a second user selecting criteria of a second wager;

automatically placing the second wager if the selected criteria of the second wager meets the predetermined selection criteria;

accepting the a second wager, the second wager representing a first selected series of potential outcomes;

accepting a pool of bets from the first and the second user if selected criteria of the bets meet predetermined selection criteria, wherein each bet represents an expected outcome from a series of events; and determining a winning bet from pool of bets, wherein the winning bet most closely selects the actual outcome of the series of events from the closest said selecting criteria of first and second bet by the users regardless of the exact winning outcome or not.

6. A computer-based data processing method for providing pari-mutuel gambling with guaranteed minimum odds and known exact current odds on a wager or an event having a plurality of potential outcomes and an actual outcome, the method comprising the steps of:

providing data to the first user as to a current state of any pool that is open, the first user determining the criteria of the first bet from the data;

providing data to the second user as to a current state of any pool that is open; and the second user determining the criteria of the second bet from the data;

a first user selecting criteria of a first wager;

automatically placing the first wager if the selected criteria of the first wager meets a predetermined selection criteria;

accepting a first wager representing a first selected series of potential outcomes; a second user selecting criteria of a second wager;

automatically placing the second wager if the selected criteria of the second wager meets the predetermined selection criteria;

accepting the a second wager, the second wager representing a first selected series of potential outcomes; and determining a winning bet from among the first bet and the second bet, wherein the winning bet most correctly selects the actual outcome of the event from the closest said selecting criteria of first and second bet by the users regardless of the exact winning outcome or not.

* * * * *